United States Patent [19]
Poulos

[11] 3,891,197
[45] June 24, 1975

[54] SINGLE LEAF SPRING
[76] Inventor: Gus L. Poulos, Rt. 1, Winamac, Ind. 46996
[22] Filed: Oct. 15, 1973
[21] Appl. No.: 406,572

[52] U.S. Cl............................. 267/47; 267/52
[51] Int. Cl........................................ B60q 11/10
[58] Field of Search............................ 267/47, 52

[56] References Cited
UNITED STATES PATENTS

| | | | |
|---|---|---|---|
| 949,308 | 2/1910 | Smith et al. | 267/52 |
| 2,587,522 | 2/1952 | Pilkington | 267/52 |
| 3,197,190 | 7/1965 | Miyashiro | 267/52 |
| 3,645,522 | 2/1972 | Rowland | 267/47 |
| 3,749,389 | 7/1973 | Duchemin | 267/52 |

Primary Examiner—James B. Marbert
Attorney, Agent, or Firm—Oltsch & Knoblock

[57] ABSTRACT

A single leaf spring used in conjunction with a pair of shackle means and an axle. The spring includes oppositely extending elongated end portions and a central portion located between such end portions and integrally formed therewith. The central portion of the spring has a thickened cross section which exceeds the cross section of the spring end portions and includes first and second oppositely located side faces. The first side face supports the axle and the second side face has a pair of spaced transversely oriented grooves formed therein. A pair of U-bolts extend around the central portion of the spring with a part of each bolt lockably fitting within one of the grooves in the second face of the spring central portion. Means are provided for engaging each bolt to secure the axle to the spring at its central portion.

5 Claims, 4 Drawing Figures

PATENTED JUN 24 1975    3,891,197

SINGLE LEAF SPRING

SUMMARY OF THE INVENTION

This invention relates to a single leaf spring which is used in conjunction with an axle carrying wheel means and a pair of shackle means secured to a vehicle frame.

The spring of this invention includes oppositely extending elongated end portions and a central portion located between such end portions and integrally formed therewith. The spring central portion has a thickened cross section which exceeds the cross section of the spring end portions and includes first and second oppositely located side faces. One of the side faces supports the axle means in a transverse relationship. The other side face has a pair of spaced grooves formed therein. Such grooves extend transversely across the face and accommodate a pair of U-bolts which straddle the central portion of the spring and which engage securement means utilized to anchor the axle to the spring at its central portion. The axle means may be positioned on the spring by a saddle which contacts that side face of the spring central portion oppositely located from the side face having the transverse grooves formed therein. This saddle contacting side face of the spring central portion carries one or more protrusions which project outwardly therefrom and which are received within accommodating recesses in the saddle to anchor the saddle against sliding movement relative to the spring central portion.

Accordingly, it is an object of this invention to provide a single leaf spring having means integrally formed therewith which accommodate U-bolts to secure an axle to the spring.

Another object of this invention is to provide a single leaf spring used in conjunction with a pair of shackle means and an axle means and which is of simplified construction and of a stress reducing configuration.

Another object of this invention is to provide a spring having means integrally formed therewith which anchor a spring saddle used to accommodate the axle against sliding movement relative to the spring.

Other objects of this invention will become apparent upon a reading of the invention's description.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
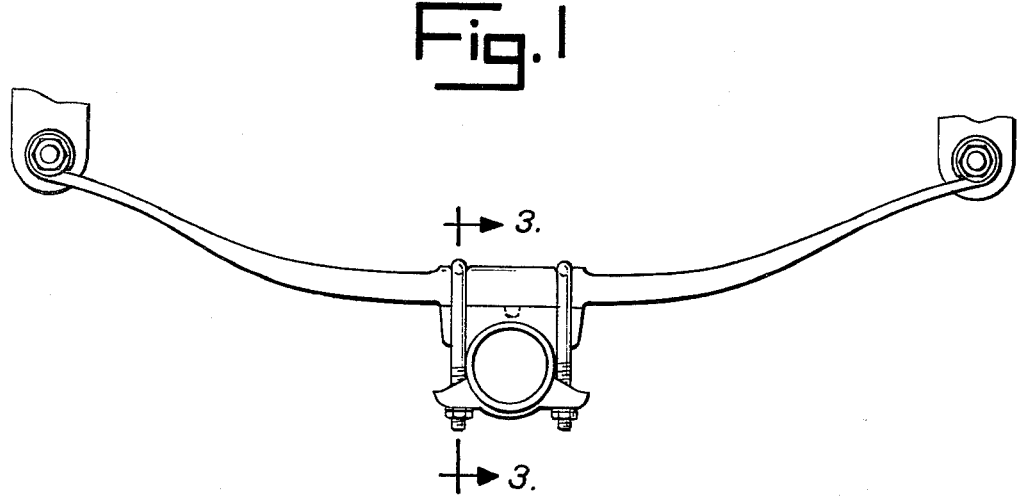
FIG. 1 is a side view of one embodiment of the spring of this invention secured between an axle and a pair of shackles.
Figure 2:
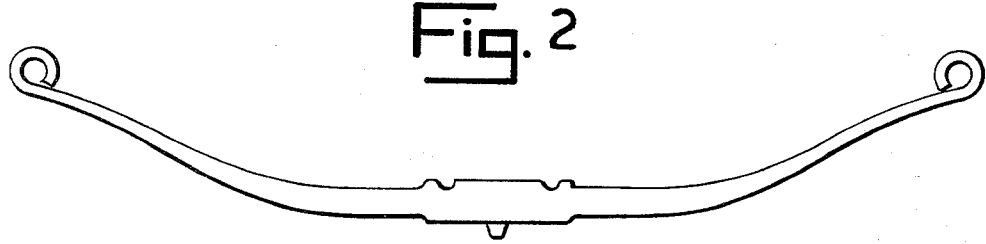
FIG. 2 is an isolated view of the spring shown in FIG. 1.
Figure 3:
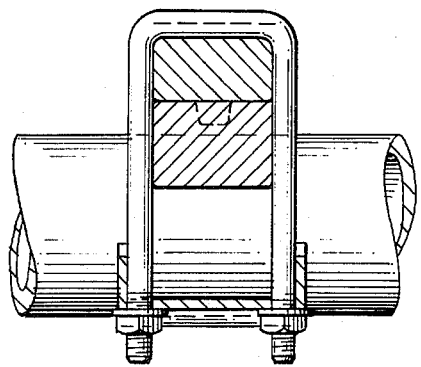
FIG. 3 is a cross sectional view of the spring and axle taken along line 3-3 of FIG. 1.

The embodiment of the single leaf spring 10 shown in FIGS. 1-3 includes a central portion 12 having ends 14. Spring 10 also includes end portions 16 which extend integrally from ends 14 of central portion 12 of the spring. Central portion 12 of spring 10 is of thickened construction having a cross sectional area which exceeds the cross sectional area of each end portion 16 at all locations along the longitudinal dimension of the end portion. End 18 of each end portion 16 is bent into an eye through which a shackle bolt 20 extends. Each shackle bolt 20 is secured to shackle housing 22 which in turn is connected to a suitable frame (not shown). It is to be understood that in some embodiments of this invention each end 18 of spring end portions 16 may be of a straight configuration and bear upwardly against a bearing support forming a part of a shackle housing. Each spring end portion preferably tapers from end 14 of spring central portion 12 to its end 18.

Central portion 12 of spring 10 includes an upper side face 24 and a lower side face 26. Upper side face 24 has a pair of parallel grooves 28 formed therein. Grooves 28 extend transversely across face 24 and are each spaced an equal distance from an end 14 of central portion 12 of the spring. The thickness of central portion 12 of the spring as measured from the base 29 of each groove 28 to lower face 26 preferably exceeds the maximum thickness of each end portion 16 of the spring as measured in the same general direction. A protrusion 30 is integrally formed on lower side face 26 and projects outwardly therefrom. Protrusion 30 is preferably centrally spaced between ends 14 of the spring central portion 12.

An axle member 32 is supported by central portion 12 of spring 10. Axle member 32 extends transversely relative to central portion 12 and carries wheels (not shown). A spring saddle 34 is located between spring central portion 12 and axle member 32. Saddle member 34 bears against lower side face 26 of spring central portion 12 and has a recess 36 formed therein which receives protrusion 30 of central portion 12. The lower marginal edge of saddle member 34 is cradle shaped and receives in a transverse orientation axle member 32. A retainer member 38 extends around the lower side of axle member 32 in vertical alignment with saddle member 34 and is secured by a pair of U-bolts 40. Each U-bolt 40 includes a pair of legs 42 interconnected at corresponding ends by an intermediate part 44. Each U-bolt is located with its legs 42 straddling central spring portion 12 and spring saddle 34 with the intermediate part 44 thereof fitting lockably within a groove 28 formed in the spring central portion. Legs 42 of each U-bolt extend through openings in retainer member 38 and are secured to the retainer member by nuts 46. U-bolts 40 connect axle member 32 to spring 10.

Central portion 12, end portion 16 and protrusion 30 of spring 10 are of integral construction, that is formed of spring 10 are of integral construction, that is formed from one piece of spring material with no welding or similar bonding processes being used. Spring 10 may be formed by starting with a blank of spring steel material of uniform width and thickness. Portions of the blank are heated with grooves 28 and protrusion 30 formed by rolling or forging. The end sections of the spring steel blank are heated and end portions 16 of the spring formed. Further heat treating and grinding follows to form the finished spring.

Figure 4:
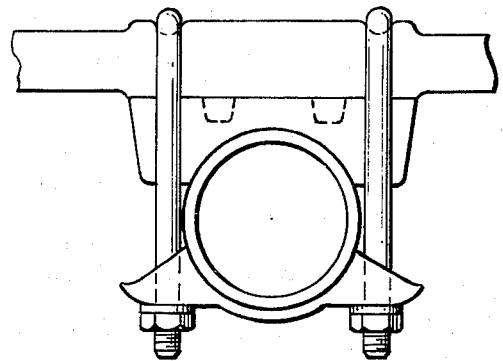
FIG. 4 is a fragmentary side view of the spring shown in modified construction and secured to an axle.

In the embodiment of spring 10 shown in FIG. 4, lower side 26 of spring central portion 12 is formed with two longitudinally aligned protrusions 30. These protrusions fit within accommodating recesses 36 in spring saddle 34 of the spring assembly. The utilization of two or more protrusions 30 in locking relationship with spring saddle 34 provide means of locating the spring relative to the axle and absorbing forces induced during acceleration, deceleration, and turning of the vehicle to which the spring is connected. The remaining construction and form of spring 10 shown in FIG. 4 is like that described for the embodiment of the spring illustrated in FIGS. 1–3.

It is to be understood that the spring of this invention may be utilized in spring assemblies utilizing snubbers which may be secured to a spring saddle and extend to one of the shackle members of the assembly. It is to be further understood that the invention is not to be limited to the details above given, but may be modified within the scope of the appended claims.

What I claim is:

1. A single leaf spring used in conjunction with a pair of shackle means and an axle, said spring comprising a central portion and two elongated end portions extending integrally outwardly from opposite ends of said central portion, said central portion having a thickened cross section exceeding the thickness of the cross sections of said end portions, said central portion having first and second oppositely located side faces extending between said ends thereof, said first side face supporting said axle in a transverse relationship, said second face having a pair of spaced grooves formed therein, said grooves extending transversely across said second face, a pair of U-bolt means, each bolt means including generally parallel legs interconnected at corresponding ends by an intermediate part, each bolt means having its legs straddling said spring central portion with the intermediate part thereof fitting lockingly in a said groove, means engaging each bolt means at the legs thereof securing said axle to said spring at said spring central portion.

2. The spring of claim 1 wherein each end portion of said spring tapers from said spring central portion.

3. The spring of claim 1 wherein the thickness of said spring central portion as measured between said first face and second face at the base of each groove is not less than the maximum cross sectional thickness of said spring end portions as measured in the same general transverse direction.

4. The spring of claim 3 wherein said first face of the spring central portion includes a protrusion means projecting outwardly from said first face and being formed integrally with said spring central portion, a spring saddle including cradle means engaging said axle, said saddle bearing against said first face and including a recess portion receiving said protrusion means for anchoring said saddle against longitudinal sliding movement over said first face.

5. The spring of claim 3 wherein said first face of the spring central portion includes at least two longitudinally spaced protrusion means projecting outwardly from said first face and being formed integrally with said spring central portion, a spring saddle including cradle means engaging said axle, said saddle contacting said first face and including spaced recess portions each receiving a protrusion means for anchoring said saddle against sliding movement over said first face.

* * * * *